(12) United States Patent
Boos

(10) Patent No.: US 7,305,216 B2
(45) Date of Patent: Dec. 4, 2007

(54) TRANSMITTING AND RECEIVING ARRANGEMENT WITH INTERFERENCE SIGNAL SUPPRESSION CONTROL

(75) Inventor: Zdravko Boos, München (DE)

(73) Assignee: Infineon Technologies AG, Munich (DE)

( * ) Notice: Subject to any disclaimer, the term of this patent is extended or adjusted under 35 U.S.C. 154(b) by 379 days.

(21) Appl. No.: 11/129,990

(22) Filed: May 16, 2005

(65) Prior Publication Data

US 2005/0266819 A1 Dec. 1, 2005

(30) Foreign Application Priority Data

May 25, 2004 (DE) ...................... 10 2004 025 576

(51) Int. Cl.
*H04B 1/40* (2006.01)

(52) U.S. Cl. ...................... 455/88; 455/65; 455/63.1; 455/68; 455/67.13; 455/278.1; 455/296; 370/201; 370/269; 370/286; 370/360; 375/296; 375/348

(58) Field of Classification Search .................. 455/88, 455/65, 63.1, 68, 67.13, 278.1, 296; 370/269; 375/348, 296

See application file for complete search history.

(56) References Cited

U.S. PATENT DOCUMENTS

| | | | | |
|---|---|---|---|---|
| 4,117,277 A | * | 9/1978 | van den Elzen et al. | 379/406.08 |
| 4,355,214 A | * | 10/1982 | Levy et al. | 370/291 |
| 4,484,322 A | * | 11/1984 | Fossati et al. | 370/287 |
| 4,539,675 A | * | 9/1985 | Fisher | 370/291 |
| 4,571,720 A | * | 2/1986 | Chevreau et al. | 370/291 |
| 4,688,245 A | * | 8/1987 | Schenk | 379/406.08 |
| 4,852,082 A | | 7/1989 | Haass | |
| 5,457,811 A | * | 10/1995 | Lemson | 455/67.11 |
| 5,678,198 A | * | 10/1997 | Lemson | 455/67.11 |
| 5,953,410 A | * | 9/1999 | Pfeil et al. | 379/406.05 |
| 6,597,923 B1 | * | 7/2003 | Vanghi et al. | 455/522 |
| 7,113,761 B2 | * | 9/2006 | Bickham et al. | 455/333 |
| 7,218,901 B1 | * | 5/2007 | Mobley et al. | 455/182.2 |

FOREIGN PATENT DOCUMENTS

| | | |
|---|---|---|
| DE | 199 34 502 A1 | 1/2001 |
| EP | 0 691 756 A1 | 1/1996 |

* cited by examiner

*Primary Examiner*—Marceau Milord
(74) *Attorney, Agent, or Firm*—Eschweiler & Associates, LLC

(57) ABSTRACT

A transmitting and receiving arrangement is disclosed having a transmission path, a reception path, and a control device for suppression of interference signals which are produced by crosstalk from the transmission path to the reception path. The control device inputs correction signals that are derived from the transmission signals into the reception path at a point therein such that the interference signals are suppressed downstream from the point. The control device has a detector that detects the interference signals on the basis of characteristics of the transmission signals.

20 Claims, 2 Drawing Sheets

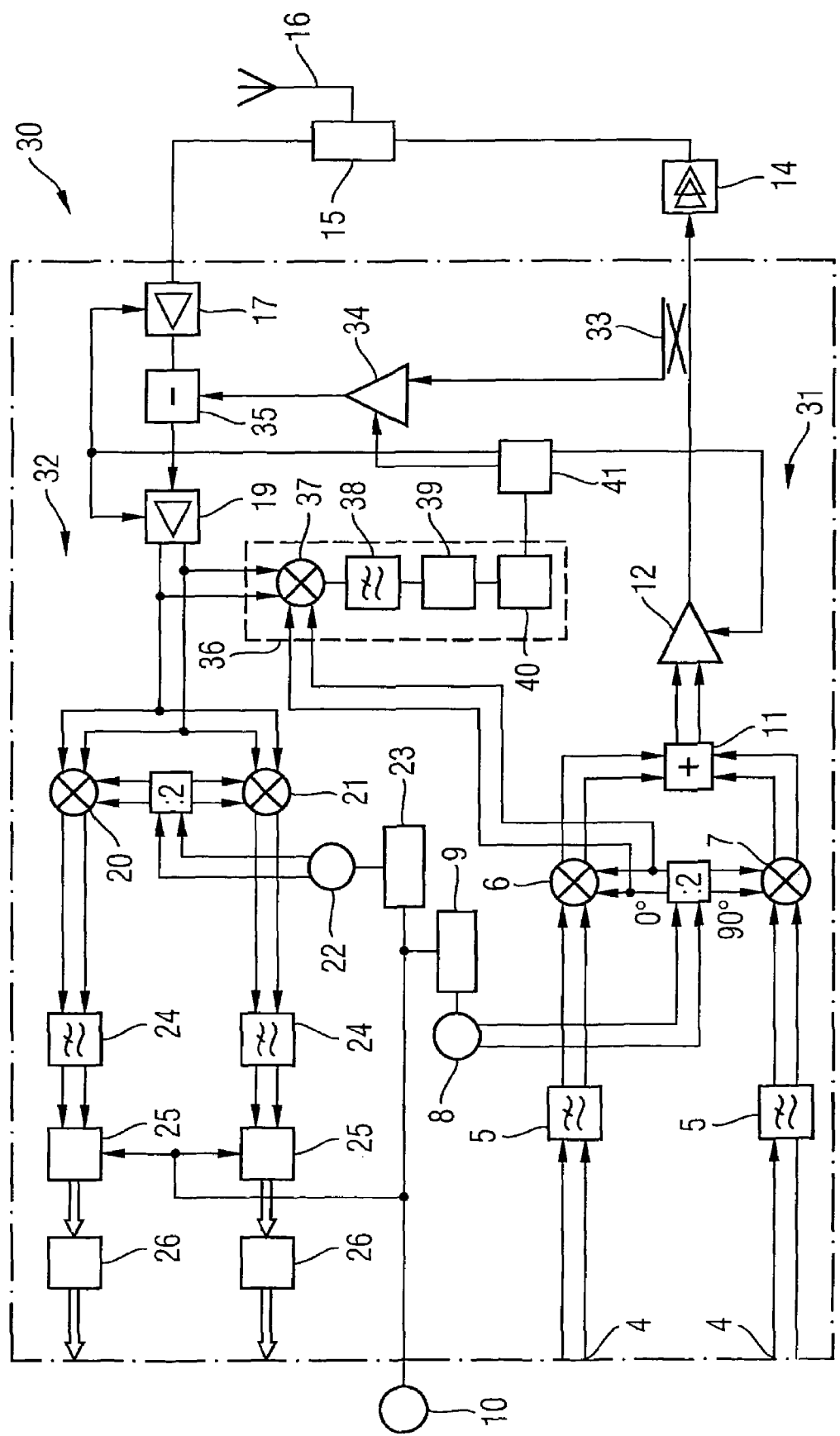

TRANSMITTING AND RECEIVING ARRANGEMENT WITH INTERFERENCE SIGNAL SUPPRESSION CONTROL

REFERENCE TO RELATED APPLICATIONS

This application claims the benefit of the priority date of German application DE 10 2004 025 576.8-35, filed on May 25, 2004, the contents of which are herein incorporated by reference in their entirety.

FIELD OF THE INVENTION

The invention relates to a transmitting and receiving arrangement having a control device which is used for suppression of interference signals. The invention also relates to an appropriately configured method.

BACKGROUND OF THE INVENTION

A transmitting and receiving arrangement which operates using a frequency division duplex method (FDD) can transmit and receive signals simultaneously. The signals are in this case transmitted and received in different frequency bands. Frequency division duplexing methods are used both in analogue communication systems and in mobile radio systems which are based on the CDMA Standard. Standards such as these include, for example, the UMTS, CDMA 2000 and IS 95 Standards.

When signals are transmitted and received simultaneously, crosstalk frequently occurs from the transmission path to the reception path, that is to say a signal to be transmitted is input from the transmission path into the reception path. A transmission signal which has been input into the reception path increases the probability of errors in the demodulation of the received signals, or even completely prevents the reception of signals. This problem becomes worse the higher the level of a signal to be transmitted is in comparison to the level of a simultaneously received signal. If, for example, the mobile station is a very long way away from the base station, the transmission signals must be transmitted from the mobile station to the base station with a relatively high transmission power. At the same time, however, the signals transmitted from the base station are received by the mobile station at only a very low power level. This means that a very high sensitivity must be chosen for the receiver. In this situation, any crosstalk from the transmission path to the reception path is particularly disadvantageous.

In order to suppress interference signals which are caused by crosstalk from the transmission path to the reception path, modern transmitting and receiving arrangements use narrowband surface acoustic wave filters, so-called SAWs. SAW filters are generally arranged both in the transmission path and in the reception path. Narrowband SAW filters have the disadvantage of high production costs as well as an increased surface area requirement and power consumption, particularly for the frequency range that is used for mobile radio.

Instead of complex SAW filters, a control loop arranged between the transmission path and the reception path can be provided in order to attenuate undesirable interference signals. A correction signal is produced as the manipulated variable for the controller, by outputting the transmission signal from the transmission path, and by amplifying and phase-shifting it in a suitable manner. The correction signal produced in this way is superimposed in the detection path on the signal that is present there. If the amplitude and the phase of the correction signal have been chosen appropriately, this procedure leads to the interference signal in the reception path being compensated for by interference with the correction signal. Any control error, that is to say any interference signal occurring after the superimposition of the correction signal in the reception path, is determined by means of a detector arranged in the reception path. The amplitude and the phase of the correction signal are set on the basis of the interference signal component, as determined by the detector, in the reception path.

Ideally, the crosstalk from the transmission signal to the reception path and the correction signal have the same amplitudes and a phase shift of 180°. In this case, the interference signal is completely cancelled out by interference with the correction signal.

The amplitude and the phase of the transmission signal which produces the crosstalk from the transmission path are influenced by a large number of parameters. These parameters include changes in the impedance of the antenna, changes in the gain and phase of the power amplifier arranged in the transmission path, production fluctuations, temperature changes, tolerances in the voltage supply, and frequency changes.

The control loops which have been used for interference signal suppression until now have the disadvantage that it is not possible, or is possible only with very great difficulty, with the detectors used for the control process to distinguish between interference signals which are caused by crosstalk to the reception path and other interference signals in the reception path. This means that the phase and the amplitude of the correction signal can be determined only with difficulty.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The invention is directed to a transmitting and receiving arrangement having a control loop for interference signal suppression which makes it possible to overcome the disadvantage, as described above, of previous transmitting and receiving arrangements. The aim in this case is to achieve accurate and reliable suppression of the interference signals caused by crosstalk.

The transmitting and receiving arrangement according to the invention, which may be implemented in a mobile radio application, comprises a transmission path for the transmission of signals, a reception path for the reception of signals, and a control device.

The control device is used for suppression of interference signals which are caused by the crosstalk from the transmission path to the reception path. The control device produces correction signals, which it derives from the signals to be transmitted via the transmission path. The correction signals are input from the control device into the reception path at an input point such that the interference signals are minimized downstream from the input point.

Furthermore, the control device has a detector device which is configured to detect the interference signals which are present in the reception path downstream from the input point. In consequence, the detector device measures the interference signals which are still present in the reception path after the correction signals have been superimposed on the signals which are present in the reception path.

In accordance with one embodiment of the invention the interference signals are detected by the detector device on the basis of at least one characteristic of the signals to be transmitted via the transmission path, or the transmitted signals. The characteristics of the signals to be transmitted include, for example, the carrier frequency at which the signals are transmitted from the antenna. Since the interference signals are detected on the basis of a characteristic of the signals to be transmitted or of the transmitted signals, the interference signals which are caused by crosstalk from the transmission path can easily be distinguished from other signals and, in particular, from other interference signals, since the interference signals which are caused by crosstalk originate from the signals to be transmitted or from the transmitted signals. In consequence, this measures allows accurate detection of the interference signals under consideration, and hence also accurate setting of the control parameters thus, overall, making it possible to achieve robust and reliable suppression of the interference signals which are caused by crosstalk.

According to one embodiment of the transmitting and receiving arrangement according to the invention, the conversion frequency with which the signals to be transmitted are mixed before they are transmitted is used as the transmission signal characteristic that is used as the criterion for distinguishing between the interference signals which are caused by crosstalk and other signals which are carried in the reception path. This measure offers the advantage that the conversion frequency is always known in the transmitting and receiving arrangement according to the invention.

A frequency generator and a first frequency conversion device are provided in one example to implement the invention as mentioned above. The frequency generator produces the conversion frequency. The first frequency conversion device, which is integrated in the transmission path, converts the signals to be transmitted from a first frequency band to a second frequency band by means of the conversion frequency.

The detector device preferably contains a second frequency conversion device. The second frequency conversion device is used to down-mix the signals which are present in the reception path downstream from the input point, by means of the conversion frequency. The second frequency conversion device is configured, in one example, to convert the sought interference signals from the second frequency band to the first frequency band.

The measure described above makes use of the fact that the frequency of the sought interference signals in the transmission path is known. The frequency conversion of all of the signals that are present in the reception path downstream from the input point results in the interference signals being transformed to a frequency range which is particularly advantageous for analysis. By way of example, this frequency range may be the baseband range.

After the conversion of the signals which are present in the reception path, the signals which have been transformed in this way are advantageously subjected to low-pass filtering. For this purpose, the second frequency conversion device is followed by a low-pass filter. The transmission characteristic of the low-pass filter is preferably set such that the only frequency range which is passed through is that in which the sought interference signals are located. The sought interference signals are thus separated from the other signals which are present in the reception path.

Alternatively, the second frequency conversion device and the downstream low-pass filter may also be replaced by a bandpass filter, which passes only those signals which are in the frequency range of the sought interference signals.

Although the frequency conversion to the carrier frequency which is required for transmission of the transmission signals can also be carried out via an intermediate frequency, the first frequency band is preferably baseband, and the conversion frequency is the carrier frequency of the transmitted signals.

According to one embodiment of the transmitting and receiving arrangement according to the invention, the control device comprises an output device for outputting signals to be transmitted from the transmission path, and an input device for inputting the correction signals into the reception path.

The first frequency conversion device in one example includes a mixer for mixing the signals to be transmitted with the conversion frequency, or includes a modulator for modulation of the conversion frequency with the signals to be transmitted.

The second frequency conversion device in one example contains a mixer for mixing the signals which are present in the reception path downstream from the input point with the conversion frequency, or contains a demodulator for demodulation of the signals which are present in the reception path downstream from the input point with the conversion frequency.

In one embodiment of the transmitting and receiving arrangement according to the invention the control device comprises a variable gain amplifier, and/or a phase shifter with a variable phase shift. The correction signals are produced by means of the amplifier and/or the phase shifter. For this purpose, the amplifier and/or the phase shifter are/is fed with the signals which are output from the transmission path. The correction signals which are produced in this way are then input into the reception path at the input point. Since the transmitting and receiving arrangement according to the invention allows the interference signals to be detected particularly well, it is possible to determine the amplitude and the phase of the correction signals such that they can be used to cancel out the interference signals by interference as comprehensively as possible.

For this purpose, it is advantageous to set the gain of the amplifier and/or the phase shift of the phase shifter on the basis of the interference signals detected by the detector device.

In one example the output device includes a line directional coupler.

The input device in one example contains an adder, by means of which the correction signals which are produced are superimposed on the signals which are present in the reception path.

A further embodiment of the transmitting and receiving arrangement according to the invention provides for the control device to comprise a computation device which uses the interference signals detected by the detector device to control the production of the correction signals. In particular, it is possible to provide for the computation device to set the gain of the amplifier and/or the phase shift of the phase shifter.

In one example, at least one transmission amplifier for amplification of the signals to be transmitted is arranged in the transmission path. Furthermore, in another example at least one reception amplifier is also arranged in the reception path, in order to amplify the received signals.

In one example, the gain of the at least one transmission amplifier and/or the gain of the at least one reception amplifier are/is advantageously variable. This allows the gain of the control loop to be set optimally, thus allowing instabilities to be avoided. In one example, the gain of the at least one transmission amplifier and/or the gain of the at least one reception amplifier are/is set by the computation device.

The method according to the invention is used for suppression of crosstalk interference signals in a transmitting and receiving arrangement which has a transmission path for the transmission of signals, and a reception path for the reception of signals. The method according to the invention comprises producing correction signals that are derived from signals to be transmitted via the transmission path, and inputting the correction signals into the reception path at an input point such that the interference signals are suppressed downstream from the input point. The interference signals that are present in the reception path downstream from the input point are detected on the basis of at least one characteristic of the signals to be transmitted via the transmission path, and new correction signals are produced that take into account the detected interference signals. The new correction signals are then input into the reception path.

In comparison to conventional methods which are used for the same purpose, the method according to the invention has the same advantages as the transmitting and receiving arrangement according to the invention.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention will be explained in more detail in the following text in an exemplary manner and with reference to the drawings, in which:

FIG. 2 is a block diagram illustrating a transmitting and receiving arrangement with a control device for interference signal suppression, as an exemplary embodiment of the transmitting and receiving arrangement according to the invention.

DETAILED DESCRIPTION OF THE INVENTION

Figure 1:
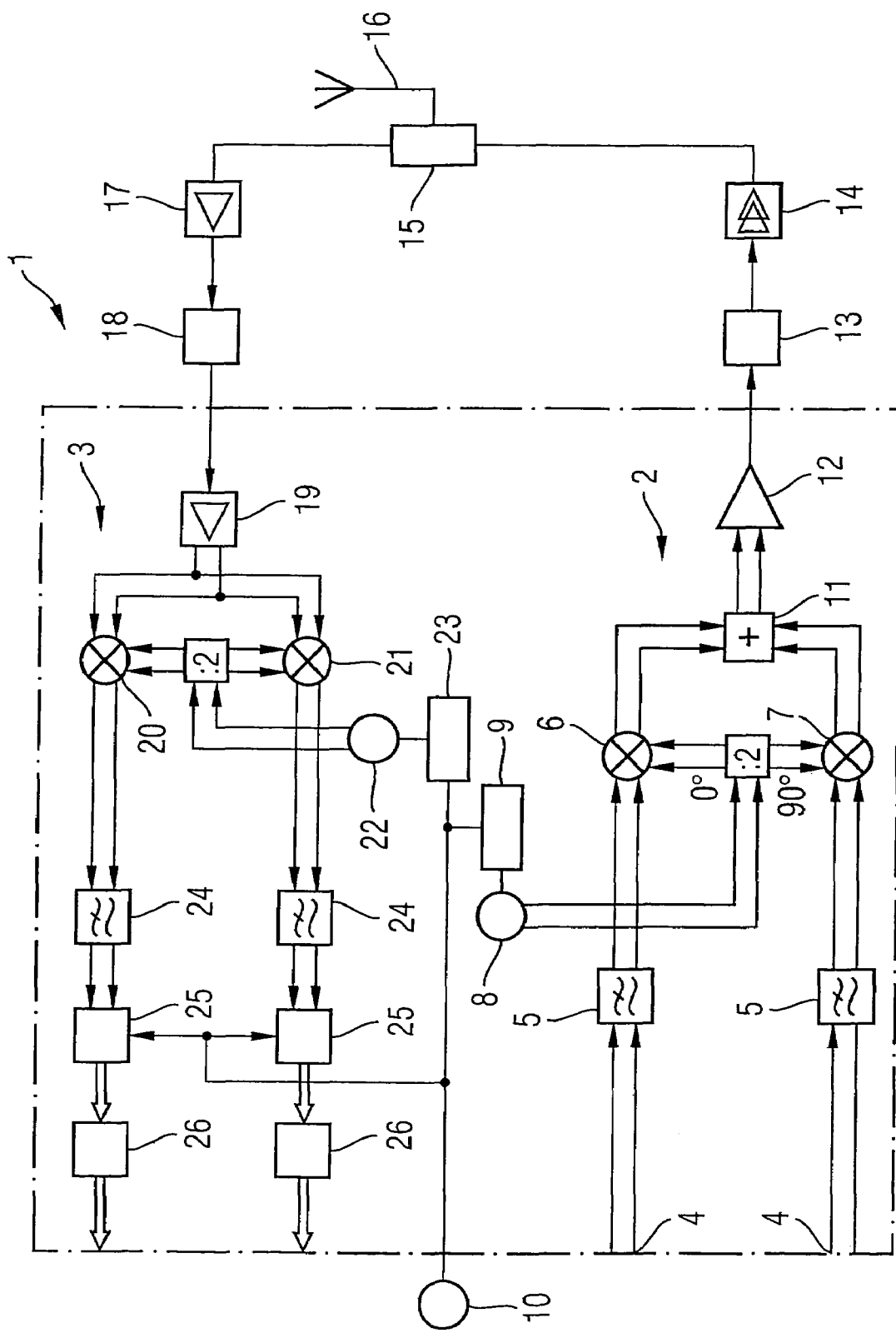
FIG. 1 is a block diagram illustrating a transmitting and receiving arrangement with interference signal suppression according to the prior art.

FIG. 1 shows a block diagram of a conventional transmitting and receiving arrangement 1, which is designed to suppress interference signals caused by crosstalk from a transmission path to a reception path. The transmitting and receiving arrangement 1 has a transmission path 2 and a reception path 3.

The transmission path 2 is designed for transmission of signals 4 which are applied to the input side. The signals 4 are composed of two quadrature components, the in-phase signal I and the quadrature signal Q. The quadrature components of the signals 4 are processed differentially. Two lines are therefore provided in each case for the in-phase signal I and for the quadrature signal Q.

The signals 4 are first of all supplied to low-pass filters 5, before they are converted by a vector modulator to the output frequency. The vector modulator, which is also referred to as an I/Q mixer, comprises the mixers 6 and 7 for this purpose. A local oscillator signal, which is generated by a voltage controlled oscillator 8, is applied to the local oscillator input of the mixer 6. A local oscillator signal, which is likewise produced by the voltage controlled oscillator 8 but is phase-shifted through 90° with respect to it, is applied to the local oscillator input of the mixer 7. The reference frequency of the voltage controlled oscillator 8 is generated by a PLL stage 9, which in turn obtains its reference frequency from a voltage controlled oscillator 10.

The signals which feed the mixers 6 and 7 are converted to the transmission frequency by means of the frequency which is produced by the voltage controlled oscillator 8. The quadrature components I and Q are then added up by means of an adder 11, and are supplied to a programmable amplifier 12. The programmable amplifier 12 carries out preamplification. The preamplification is used to produce suitable signal levels for transmission amplification, which will be carried out later.

The programmable amplifier 12 is followed by an SAW filter 13. The SAW filter 13 arranged in the transmission path 2 is used to suppress any mirror-image frequencies resulting from the mixing process in the transmission path 2, and to suppress intermodulation products.

A power amplifier 14 is arranged downstream from the SAW filter 13 in the transmission path 2. The output of the power amplifier 14 is connected to an input of a duplexer 15, which feeds an antenna 16 with the signals to be transmitted.

During reception, the signals which are received by the antenna 16 are fed into the reception path 3 via the duplexer 15. A low-noise amplifier 17 is connected downstream from the input of the reception path 3. The low-noise amplifier 17 is followed by an SAW filter 18. The narrowband SAW filter 18 typically has an attenuation of about 25 to 30 dB, and thus suppresses the crosstalk signal from the transmission path 2 to a level of −45 to −51 dBm. The low-noise amplifier 17 is required in order to compensate for the additional attenuation of the SAW filter 18 within the useful signal band, and to decouple the duplexer 15 from the SAW filter 18. This improves the signal-to-noise ratio for the received signal in the useful signal band.

The output of the SAW filter 18 is connected to the input of a low-noise amplifier 19, which amplifies the signal applied to its input so as to achieve the level required for further processing. The amplified signal is supplied to a vector modulator, which contains two mixers 20 and 21.

A local oscillator signal which is generated by a voltage controlled oscillator 22 is supplied to each of the local oscillator inputs of the mixers 20 and 21, with the two local oscillator signals having a phase shift of 90° with respect to one another. The reference frequency of the voltage controlled oscillator 22 is generated by a PLL stage 23, which in turn obtains its reference frequency from the voltage controlled oscillator 10.

The received signal is down-mixed by the mixers 20 and 21 to baseband, and is also subdivided into its quadrature components I and Q. The quadrature components I and Q are then supplied to low-pass filters 24 and analogue/digital converters 25. After digitization, digital signal processing is carried out in a digital signal processor 26.

FIG. 2 shows the block diagram of a transmitting and receiving arrangement 30 with a control device for interference signal suppression, as an exemplary embodiment of the transmitting and receiving arrangement according to the invention. The transmitting and receiving arrangement 30 has a transmission path 31 and a reception path 32.

The transmitting and receiving arrangement 30 in one example and the transmitting and receiving arrangement 1 as described above and illustrated in FIG. 1 have a number of identical components. These components are provided with the same reference symbols.

The transmitting and receiving arrangement 30 can preferably be used in mobile radios which are designed for mobile radio standards which use a frequency division duplexing operating mode.

In order to attenuate the interference signals which are produced by crosstalk from the transmission path 31 to the reception path 32, the transmitting and receiving arrangement 30 contains a control device. For this purpose, a coupling element 33 is connected in the transmission path 31 between the programmable amplifier 12 and the power amplifier 14. The coupling element 33 is used to output a proportion of the signals to be transmitted. For outputting purposes, the coupling element 33 contains a contact wire which is inductively coupled to the transmission path 31. This is achieved, by way of example, by a suitable parallel arrangement of the contact wire and the transmission path 31. The coupling is designed such that it at the same time provides screening for the transmission path 31 against interference signals. In addition, the coupling element 33 contains matching elements, which match the impedance of its output, which is connected to the power amplifier 14, to the impedance of the input of the power amplifier 14.

The signals which are output from the transmission path 31 by the coupling element 33 are supplied to a circuit 34. The circuit 34 contains both an amplifier and a phase shifter. The amplifier and the phase shifter are connected in series. A control input of the circuit 34 is used to set the gain, with both a positive and a negative gain factor, and to set the phase shift. The output of the circuit 34 is connected to a first input of an adder 35. The adder 35 is inserted in the reception path 32. The second input of the adder 35 is connected to the output of the low-noise amplifier 17. The low-noise amplifier 19 is connected downstream from the output of the adder 35.

Active suppression is used to achieve suppression of a component of the transmission signal transferred by crosstalk to the reception path 32. For this purpose, the proportion of the signals to be transmitted which is output from the coupling element 33 is supplied to the circuit 34, and then to the first input of the adder 35. At the same time, the signal to be transmitted is amplified by the power amplifier 14, and is supplied via the duplexer 15 to the antenna 16, which transmits the signal. A proportion of the transmission signal resulting from crosstalk reaches the reception path 32, and the second input of the adder 35.

The amplitude and the phase of the output transmission signal are set in the circuit 34 in order to eliminate the crosstalk signal component from the reception path 32. When the signal which is supplied via the circuit 34 to the adder 35 has the same amplitude and a phase shift of 180° with respect to the crosstalk transmission signal component, the crosstalk transmission signal is completely compensated for by interference in the adder 35.

Any change in the crosstalk signal in the reception path 32 is registered by a detector 36. The method of operation of the detector 36 is based on the fact that the frequency of the signal to be detected is known in the transmitting and receiving arrangement 30, since the signal is produced by the transmitting and receiving arrangement 30 itself.

The input of the detector 36 is connected to the output of the low-noise amplifier 19. A mixer 37 is connected downstream from the input of the detector 36. The local oscillator signal which is fed to the local oscillator input of the mixer 37 is generated in the same way as the local oscillator signal for the mixers 6 and 7, which are arranged in the transmission path 31, by the voltage controlled oscillator 8.

Since suppression of the crosstalk signal is required only for the highest 20 to 30 dB of the signal to be transmitted, the detector 36 is designed such that it is highly linear and satisfies moderate noise requirements. Owing to the high linearity of the detector 36, other interference signals than the interference signals caused by crosstalk are not converted to the frequency band around 0 Hz. However, since it is precisely this frequency range which is of interest for the evaluation process described in the following text, it can be assumed that, after the frequency conversion process, only those interference signals which are caused by crosstalk from the transmission path 31 will be located in the frequency range.

The signals which have been converted to baseband by the mixer 37 first of all pass through a low-pass filter 38. Those signals which are not of interest are thus suppressed, leaving only the sought interference signals. Owing to the moderate noise requirements, the low-pass filter 38 requires only a small surface area.

Before the interference signals which have passed through the low-pass filter 38 leave the detector 36, they pass through a rectifier 39 and an analogue/digital converter 40.

The digital signal which is produced at the output of the detector 36 indicates the extent to which a crosstalk transmission signal is contained in the reception path 32 downstream from the adder 35. The digital signal which is produced by the detector 36 is supplied to a microprocessor 41. The microprocessor 41 uses this digital signal and an algorithm that is stored in it to determine the amplitude and the phase of the correction signal to be produced by the circuit 34. The corresponding control signals are supplied by the microprocessor 41 to the circuit 34 via its control input. Overall, this results in the crosstalk transmission signal being eliminated from the reception path 32.

In addition to being connected to the control input of the circuit 34, the microprocessor 41 is also connected to the control inputs of the programmable amplifier 12 and the low-noise amplifiers 17 and 19. The gains of the amplifiers 12, 17 and 19 are set by the microprocessor 41 such that the loop gain assumes an optimum value, and instabilities are avoided.

The dominant pole in the calibration loop can be provided by capacitances, or can be implemented digitally in the microprocessor 41.

Although the adder 35 is arranged between the low-noise amplifiers 17 and 19 in the exemplary embodiment of the transmitting and receiving arrangement according to the invention as illustrated in FIG. 2, the adder 35 can also be arranged upstream of the low-noise amplifier 17, or downstream from the low-noise amplifier 19. In a corresponding manner to the arrangement of the adder 35, the point at which the detector 36 taps off the signals which are present in the reception path 32 can also be provided at a different location to that illustrated in FIG. 2.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A transmitting and receiving arrangement, comprising:
    a transmission path for the transmission of signals;
    a reception path for the reception of signals; and
    a control device configured to suppress interference signals in the reception path that are produced by crosstalk from the transmission path by inputting correction signals derived from signals to be transmitted via the transmission path into the reception path at an input point thereof such that the interference signals are suppressed downstream from the input point in the reception path, and
    wherein the control device comprises a detector device configured to detect the interference signals that are present in the reception path downstream from the input point based on at least one characteristic of the signals to be transmitted via the transmission path.

2. The transmitting and receiving arrangement of claim 1, further comprising:
    a frequency generator configured to produce a conversion frequency;
    the transmission path comprising a first frequency conversion device configured to convert the signals to be transmitted from a first frequency band to a second frequency band using the conversion frequency; and
    wherein the detector device is configured to detect the interference signals that are present in the reception path downstream from the input point using the conversion frequency.

3. The transmitting and receiving arrangement of claim 2, wherein the detector device comprises a second frequency conversion device configured to convert signals that are present in the reception path downstream from the input point using the conversion frequency.

4. The transmitting and receiving arrangement of claim 3, further comprising a low-pass filter coupled downstream of the second frequency conversion device.

5. The transmitting and receiving arrangement of claim 2, wherein the first frequency band comprises baseband, and the conversion frequency comprises the carrier frequency of the transmitted signals.

6. The transmitting and receiving arrangement of claim 1, wherein the control device comprises:
    an output device configured to output signals to be transmitted from the transmission path; and
    an input device configured to input the correction signals into the reception path.

7. The transmitting and receiving arrangement of claim 6, wherein the output device comprises a line directional coupler.

8. The transmitting and receiving arrangement of claim 6, wherein the input device comprises an adder configured to superimpose the correction signals on the signals that are present in the reception path.

9. The transmitting and receiving arrangement of claim 1, wherein the control device comprises a variable-gain amplifier or a phase shifter with a variable phase shift, wherein the amplifier or the phase shifter is fed by signals associated with the transmission path, and wherein the correction signals are produced by the amplifier or by the phase shifter, and are input into the reception path at the input point.

10. The transmitting and receiving arrangement of claim 8, wherein the gain of the amplifier or the phase shift of the phase shifter are configured to vary as a function of the interference signals detected by the detector device.

11. The transmitting and receiving arrangement of claim 1, wherein the control device comprises a computation device configured to employ the interference signals detected by the detector device to produce the correction signals.

12. A method for suppressing crosstalk interference signals in a transmitting and receiving arrangement which has a transmission path for the transmission of signals, and has a reception path for the reception of signals, comprising:
    (a) producing correction signals that are derived from signals to be transmitted via the transmission path;
    (b) inputting the correction signals into the reception path at an input point thereof that causes a suppression of the interference signals downstream of the input point;
    (c) detecting the interference signals present in the reception path downstream from the input point based on at least one characteristic of the signals to be transmitted via the transmission path;
    (d) producing new correction signals that take into account the detected interference signals, in accordance with (a); and
    (e) repeating (c) and (d).

13. The method of claim 12, further comprising:
    producing a conversion frequency;
    converting the signals to be transmitted via the transmission path using the conversion frequency from a first frequency band to a second frequency band; and
    detecting the interference signals that are present in the reception path downstream from the input point using the conversion frequency.

14. The method of claim 13, wherein the signals that are present in the reception path downstream from the input point are converted using the conversion frequency to detect the interference signals which are present in the reception path downstream from the input point.

15. A transceiver, comprising:
    a transmission path configured to generate a transmission signal;
    a reception path configured to receive a signal transmitted to the transceiver; and
    a control device configured to generate a correction signal and superimpose the correction signal over the received signal in the reception path to generate a compensated received signal, wherein the correction signal is a function of the transmission signal and the compensated received signal.

16. The transceiver of claim 15, wherein the control device comprises a coupling element associated with the transmission path, and configured to tap off a signal associated with the transmission signal for use in generating the correction signal.

17. The transceiver of claim 15, wherein the control device further comprises:
 detection circuitry configured to ascertain an amount of remaining crosstalk associated with the transmission signal in the compensated received signal in the reception path, and generate a control signal in response thereto; and
 a correction signal generator configured to receive the control signal and modify an amplitude, or a phase, or both, of a signal derived from the transmission signal to form the correction signal.

18. The transceiver of claim 17, further comprising an adder circuit configured to superimpose the correction signal and the received signal to form the compensated received signal.

19. The transceiver of claim 17, wherein the detection circuitry is configured to ascertain the amount of remaining crosstalk based on at least one characteristic of the transmission signal.

20. The transceiver of claim 19, wherein the at least one characteristic of the transmission signal comprises a carrier frequency at which the transmission signal is transmitted from an antenna associated with the transceiver.

* * * * *